United States Patent
Evans et al.

(10) Patent No.: US 10,018,423 B2
(45) Date of Patent: *Jul. 10, 2018

(54) HEAT EXCHANGER

(71) Applicant: Johnson Matthey Process Technologies, Inc., Savannah, GA (US)

(72) Inventors: Martin Evans, Savannah, GA (US); Charles Radcliffe, Savannah, GA (US)

(73) Assignee: Johnson Matthey Public Limited Company, London (GB)

(*) Notice: Subject to any disclaimer, the term of this patent is extended or adjusted under 35 U.S.C. 154(b) by 49 days.

This patent is subject to a terminal disclaimer.

(21) Appl. No.: 15/060,088

(22) Filed: Mar. 3, 2016

(65) Prior Publication Data

US 2016/0258689 A1    Sep. 8, 2016

Related U.S. Application Data

(60) Provisional application No. 62/127,336, filed on Mar. 3, 2015.

(51) Int. Cl.

| | | |
|---|---|---|
| F28D 1/04 | (2006.01) |
| F28D 1/047 | (2006.01) |
| F28F 9/013 | (2006.01) |
| F28F 9/00 | (2006.01) |
| C10G 3/00 | (2006.01) |
| C10G 11/18 | (2006.01) |

(Continued)

(52) U.S. Cl.
CPC .............. *F28D 1/0472* (2013.01); *F28D 1/04* (2013.01); *F28F 9/001* (2013.01); *F28F 9/013* (2013.01); *F28F 9/0137* (2013.01); *C10G 3/42* (2013.01); *C10G 11/18* (2013.01); *F28D 2021/0045* (2013.01); *F28F 1/28* (2013.01); *Y02P 30/20* (2015.11)

(58) Field of Classification Search
CPC ............ F28D 1/0472; F28D 2001/0273; F28F 2265/18; F28F 9/0132; F28F 9/0137; Y10S 165/90; C10G 9/002
USPC ........................................................ 165/124
See application file for complete search history.

(56) References Cited

U.S. PATENT DOCUMENTS

| 243,737 | A | * | 7/1881 | Strater | ................... | F28F 9/002 |
| | | | | | | 165/67 |
| 3,088,484 | A | * | 5/1963 | Marsh | ...................... | A47L 5/38 |
| | | | | | | 137/360 |

(Continued)

FOREIGN PATENT DOCUMENTS

| EP | 1046875 A2 | 10/2000 |
| EP | 1645829 A2 | 4/2006 |

(Continued)

*Primary Examiner* — Stephen K Cronin
*Assistant Examiner* — Mark L Greene
(74) *Attorney, Agent, or Firm* — Kevin M. Carroll

(57) ABSTRACT

A heat exchanger for cooling particulate matter from a high-temperature industrial process or warming material from a cryogenic process is disclosed. The heat exchanger comprises a structure comprising a rectangular frame, piping that is supported by the rectangular frame and completes at least one circumference around the rectangular frame, and a fan. The piping is supported to the frame on a series of moving supports. The piping comprises an inlet end and an outlet end, and the piping contains external cooling fins. The structure is sealed except for where the finned piping is located.

10 Claims, 2 Drawing Sheets

(51) Int. Cl.
*F28F 1/28* (2006.01)
*F28D 21/00* (2006.01)

(56) References Cited

U.S. PATENT DOCUMENTS

| | | | | |
|---|---|---|---|---|
| 3,495,655 | A * | 2/1970 | Fordyce | F28B 1/06 |
| | | | | 165/110 |
| 3,759,321 | A * | 9/1973 | Ares | F24F 1/06 |
| | | | | 165/125 |
| 3,792,689 | A * | 2/1974 | Cross | F22B 37/24 |
| | | | | 122/510 |
| 5,816,318 | A * | 10/1998 | Carter | F28C 1/14 |
| | | | | 165/110 |
| 7,431,894 | B2 | 10/2008 | Evans | |
| 8,092,756 | B2 | 1/2012 | Evans et al. | |
| 8,146,414 | B2 | 4/2012 | Evans et al. | |
| 2006/0108107 | A1* | 5/2006 | Naukkarinen | F28D 1/0472 |
| | | | | 165/163 |
| 2010/0193163 | A1* | 8/2010 | Rollins | F04D 15/00 |
| | | | | 165/121 |

FOREIGN PATENT DOCUMENTS

| | | | |
|---|---|---|---|
| EP | 2078912 | A1 | 7/2009 |
| WO | 2014188346 | A1 | 11/2014 |

\* cited by examiner

FIGURE 1: Heat Exchanger
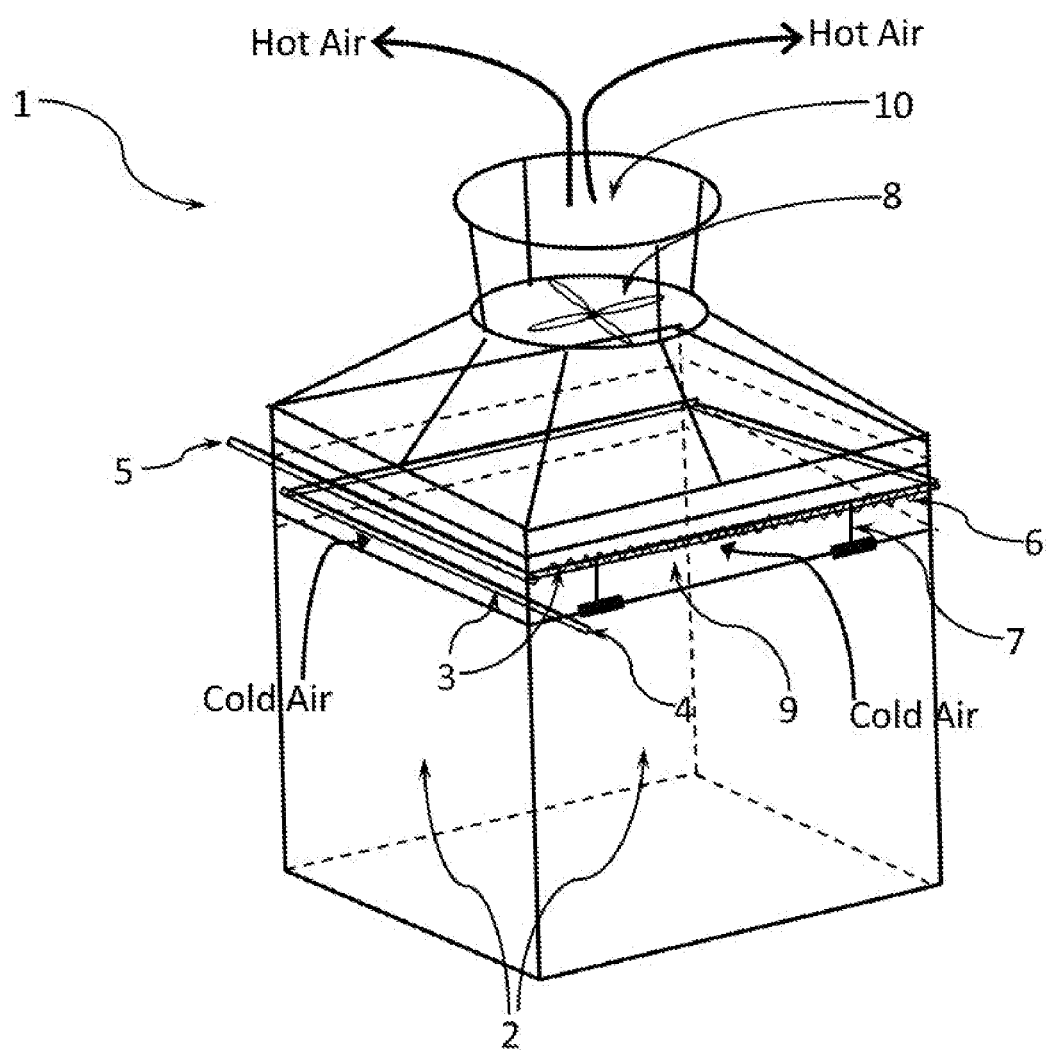

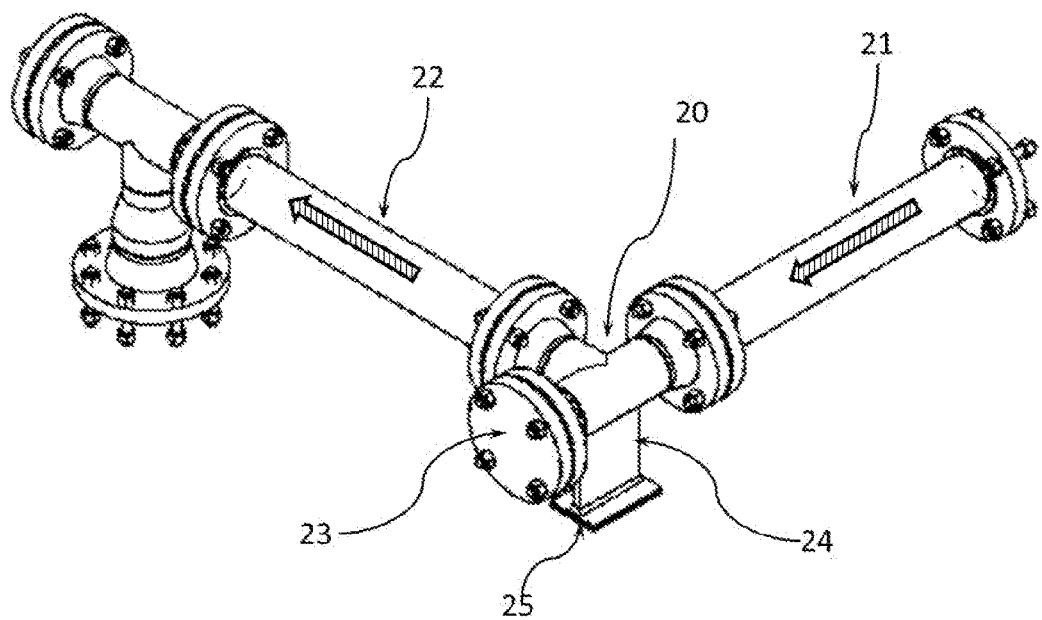
FIGURE 2: Blind Tee at Corner of Piping Circumference

HEAT EXCHANGER

FIELD OF THE INVENTION

The invention is a heat exchanger, in particular for cooling particulate matter from high temperature operations such as a fluid catalytic cracking ("FCC") process or warming material from cryogenic processes such as a pharmaceutical manufacturing process.

BACKGROUND OF THE INVENTION

A conventional fluid catalytic cracking system generally includes a fluid catalytic cracking (FCC) unit coupled to a catalyst injection system, a petroleum feed stock source an exhaust system, and a distillation system. The FCC unit includes a regenerator and a reactor. The reactor primarily houses the catalytic cracking reaction of the petroleum feed stock and delivers the cracked product in vapor form to the distillation system. Spent catalyst from the cracking reaction is transferred from the reactor to the regenerator to regenerate the catalyst by removing coke and other materials. The regenerated catalyst is then reintroduced into the reactor to continue the petroleum cracking process. The catalyst injection system maintains a continuous or semi-continuous addition of fresh catalyst to the inventory circulating between a regenerator and a reactor.

During the catalytic process, there is a dynamic balance of the total catalyst within the FCC unit. For example, catalyst is periodically added utilizing the catalyst injection system and some catalyst is lost in various ways such as through the distillation system, through the effluent exiting the regenerator, etc. If the amount of catalyst within the FCC unit diminishes over time, the performance and desired output of the FCC unit will diminish, and the FCC unit will become inoperable. Conversely, if the catalyst inventory in the FCC unit increases over time or becomes deactivated, the catalyst bed level within the regenerator reaches an upper operating limit and the deactivated or excess catalyst is withdrawn to prevent unacceptably high catalyst emissions into the flue gas stream, or other process upsets. Thus, the typical fluid catalytic cracking system also contains a withdrawal apparatus suitable for withdrawing materials from one or more units, like FCC units.

U.S. Pat. No. 7,431,894 teaches a catalyst withdrawal apparatus and method for regulating catalyst inventory in a fluid catalytic cracking catalyst (FCC) unit. In this design, a heat dissipater is located adjacent the metering device and is adapted to cool catalyst entering the pressure vessel.

U.S. Pat. No. 8,092,756 teaches a catalyst withdrawal apparatus and method for regulating catalyst inventory in a unit. One embodiment of this catalyst withdrawal apparatus includes a vessel coupled to a heat exchanger.

U.S. Pat. No. 8,146,414 teaches a method comprising withdrawing material from a FCC unit to a heat exchanger coupled to the fluid catalytic cracking unit. The heat exchanger has a material inlet; a material outlet; a cooling fluid inlet and a cooling fluid outlet with respective temperatures. The method further comprises measuring the respective temperatures at the material inlet, material outlet, cooling fluid inlet and cooling fluid outlet of the heat exchanger; determining a change in temperature between the material inlet and material outlet and determining a change in temperature between the cooling fluid inlet and cooling fluid outlet; and correlating the change in temperature between the material inlet and material outlet and the change in temperature between the cooling fluid inlet and cooling fluid outlet to a metric of material withdrawn from the unit.

The heat exchanger in U.S. Pat. No. 8,146,414 is disclosed to include a housing that includes a tube maintained at a spaced apart relation from a first conduit. The first conduit includes one or more protrusions, such as fins (studs or other geometric shape) extending into the coolant volume defined between the housing and the first conduit that increases the heat transfer area.

Although effective, the pipe-in-pipe heat exchangers described in the above inventions have several drawbacks, including that they are expensive to build, the coolant air blower is expensive to build and operate, and the thermal expansion of the piping as it heats and cools over these wide temperature extremes is problematic. The piping has to be designed so that the thermal stresses caused by expansion and contraction as the temperature cycles between hot (operating) and cold (not in operation) do not cause the pipe to fail. This requires long expansion bellows, and elaborate sliding piping supports, and exchanger supports that allow for movement.

Similar problems are encountered with such a heat exchanger design when extremely cold streams need to be warmed, for example cryogenic liquids that need to be brought to room temperature or above. In this case, the problem relates to piping contraction when in service, and expansion when the process is stopped. These problems are just the inverse of those stated above, and require very similar engineering design changes to accommodate them.

It is therefore desirable to attain an improved heat exchanger for cooling mixtures of particulate matter and gases from high temperature operations such as fluid catalytic cracking ("FCC") process or warming material from cryogenic processes such as a pharmaceutical manufacturing process. We have discovered a new heat exchanger to cool mixtures of particulate matter and gases from industrial processes, and also to warm material from a cryogenic process.

SUMMARY OF THE INVENTION

The invention includes a heat exchanger for cooling particulate matter from a high-temperature industrial process or warming material from a cryogenic process. The heat exchanger comprises a structure comprising a rectangular frame, piping that is supported by the rectangular frame and completes at least one circumference around the rectangular frame, and a fan. The piping is supported to the frame on a series of moving supports. The piping comprises an inlet end and an outlet end, and contains external cooling fins. The structure is sealed except for where the finned piping is located.

BRIEF DESCRIPTION OF THE DRAWINGS

FIG. 1 shows an embodiment of the heat exchanger of the invention.

FIG. 2 shows a blind tee (a pipe tee having one end sealed) at a corner of piping circumference.

DETAILED DESCRIPTION OF THE INVENTION

The invention includes a heat exchanger for cooling particulate matter from a high-temperature industrial process. Preferable industrial processes include manufacture of pyridine and its derivatives the manufacture of acrylonitrile, processes to convert methanol to olefins or other products (MTX processes), fluid catalytic cracking (FCC) processes, and other chemical manufacturing processes. The particulate matter is preferably catalysts or additives that are added to the industrial process. The invention is particularly suited for cooling a mixture of powdered FCC catalysts and/or additives and air that is withdrawn from a fluid catalytic cracking process, which may be withdrawn from a FCC unit at temperatures of up to approximately 750° C., or catalysts and/or additives from MTX processes. The heat exchanger can also be used for warming material from a cryogenic process such as a pharmaceutical manufacturing process. The material is preferably the product of the cryogenic process. For purposes of simplicity, the following description will focus on the cooling of particulate matter from a high-temperature industrial process. However, those skilled in the art will recognize the equal applicability of this design to warming of material from a cryogenic process.

The heat exchanger comprises a structure comprising a rectangular frame, preferably a square frame. The rectangular frame is preferably a metal frame. The rectangular frame supports piping, which completes at least one circumference around the rectangular frame. Preferably, the piping completes at least two circumferences around the rectangular frame.

The piping is supported to the frame on a series of moving supports. The moving supports are designed to allow the piping to move horizontally but limit movement vertically. The moving supports are preferably spring hangers or sliding plates. One configuration of moving supports consists of a shoe which is attached to the underside of the pipe, and a corresponding support plate supported off the main structure. The shoe is preferably arranged so that the flat surface of the shoe can slide on the support plate in the x or y direction in any horizontal plane. This movement of the shoe on this plane is ideally unconstrained, although in some circumstances it may be preferable to restrict the degree of movement to prevent the shoe from slipping off the support plate. Preferably, there is a low friction coating applied to the base of the shoe and the upper surface of the support plate, to allow the shoe to move freely. Examples of such coatings might be PTFE, graphite, or other similar low friction materials.

As the piping heats up as hot particulate matter moves through the piping, the net effect of thermal expansion of the pipe will be to elongate each side of the rectangular frame. Conversely, as the piping cools as cold material moves through the piping, the net effect of thermal contraction of the pipe will be to shorten each side of the rectangular frame. The use of the series of moving supports allows to piping to be free to elongate as the piping expands, and thus allows for this expansion. Preferably, there will be a limited number of fixed support points to keep the whole structure rigid, including at the inlet end and at the termination of each complete circumference. However, these could be located at various locations to help control the movement. The rectangular shape grants an inherent stability of shape to the piping, allowing sufficient movement to handle expansion without allowing the loops to break free from the structure. This means that the moving supports do not need to be too restrictive. As all four sides of the piping circumference expand together, this results in the piping moving slightly away from the frame and the whole "rectangular" circumference of piping may move a few inches outwards, away from the supporting structure. Anyone skilled in the art of designing piping supports will understand how to support the piping in this invention. This design has the advantage of allowing the piping to expand and contract freely, without imparting stresses on the associated piping and equipment that would otherwise require the provision of expansion joints, sliding seals, etc.

The piping comprises an inlet end and an outlet end. The inlet end is preferably connected to the industrial process, and in particular to the regenerator of an FCC unit. The outlet end of the piping is preferably connected to one or more collection vessels.

The piping may be arranged so that after one complete circumference of the frame, the outlet end of the piping is just above the inlet end of the piping; alternatively, the piping may be arranged so that after one complete circumference of the frame, the outlet end of the piping is just below the inlet end of the piping. This spiral arrangement allows for the tubes to be located in close proximity to each other in the vertical direction. This is ideal for minimizing the amount of cooling air that bypasses around the cooling fins. The vertical offset between each successive piping circumference is ideally set to closely match the overall height of each section of finned piping.

Preferably, at each corner of each piping circumference (i.e., at the corners of the rectangular frame) the piping will be connected with a pipe tee with one end sealed (a "blind tee", as known in the art) to ensure that erosion from the powder flowing inside the piping is minimized. In conventional liquid or gas flow piping service changes in direction are made by the use of short radius, or long radius pipe elbows. While these elbows can be used in service where powders are transported in air, they are very prone to erosion. The preferred design is to use a pipe tee instead of an elbow in this service, where the tee is arranged with one end sealed using a blind flange. In this way, the catalyst that flows into the tee fills up the blind end. As additional catalyst flows into the tee it is then forced to turn by bouncing off the catalyst that has settled inside the blind tee. This means that the erosional force of the catalyst flow is expended on the packed bed of catalyst in the tee, rather than on the piping walls. This results in significantly reduced piping erosion. These tees will also help to dissipate piping stresses.

The piping contains external cooling fins. These fins are attached to the exterior surface of the pipe in a conventional manner that will be very familiar to those who are skilled in the art of manufacturing conventional air-cooled heat exchangers. The fins are typically external projections on the piping that extend the surface in contact with the cooling/heating medium (i.e., ambient air). These fins can be lateral fins of various thicknesses, sizes and materials; they can be circular, square or with serrated edges; in addition the fins may include studs, pegs and other shapes which help to maximize the transfer of heat between the ambient air and the fluid particulate mixture, as determined in the art of designing heat exchangers. The material of the fins is selected to allow maximum heat transfer, and the shape and attachment of the fins is designed to withstand the cyclic thermal stresses involved in such a service. The use of external fins allows for rapid cooling (or rapid heating) of the piping contents. Heat lost will go to ambient air.

Preferably, the length of the piping and number of circumferences can be tailored to the particular application. For example, if the cooling requirement is low, maybe only 1 to 4 circumferences are needed. If the cooling requirement is high, 8 or 10 circumferences may be needed.

The heat exchanger also comprises one or more fans, which allows the cooling of the finned piping to be enhanced by drawing in ambient air over the fins on the piping. The velocity of air to be maintained over the fins is preferably a design variable. There is a trade-off between the power and size of the fan, and the heat exchange area required. For example, increasing the air velocity through the use of a larger, more powerful fan will result in more heat transfer, and reduce the number of circumferences required. However, as velocity continues to increase, the extra benefits gained become smaller.

Preferably, the fan is centrally located on the structure above the piping. An alternative arrangement is where the fan is arranged to blow cold air into the structure, instead of extracting hot air from the structure. In such an arrangement, it may be preferable to locate the fan underneath the structure instead of on the top.

When the rectangular frame is square in shape, one fan in preferably used. When the frame is a rectangle having unequal adjacent sides in contrast to a square, two or more fans are preferably used for optimum cooling/warming.

The structure is sealed except for where the finned piping is located, such that the sides of the structure are sealed except for openings in the structure for where the finned piping is located. This vent allows the cooling air to enter or leave the structure, such that the gaps in the sides around the finned piping allow the air that is drawn in by the fan to contact the finned piping at the maximum possible velocity.

Preferably, the heat exchanger is supported off the ground on one or more legs.

The heat exchanger of the invention provides numerous advantages. A particular advantage of the heat exchanger is that the piping is preferably installed in sections, one side at a time, so that it is easy to use different piping materials and specifications for different parts of the heat exchanger. For example, the first section of the heat exchanger (which will experience the highest temperatures) may be made from a high cost alloy suitable for high temperatures such as Inconel, or 304H stainless steel. After a certain number of circumferences, the temperature will have dropped enough to allow a cheaper and more robust material of construction (for example, low Cr alloy steel, or even carbon steel). Several different metals can be used in this way to minimize construction costs. This same advantage can be utilized when warming materials from cryogenic processes, although different piping materials would be used as would be apparent to one of ordinary skill in the art.

Another advantage of the heat exchanger is that this design makes it very easy to replace any piping that may become damaged. Because the piping is all located outside the structure, and is connected by bolted flanges at the end of each side, it is easy to replace one length at a time. Also, piping which is exposed to high temperatures over long periods is also known to be prone to creep. This means that it is important to monitor the diameter of the pipe periodically to determine when it needs to be replaced due to excessive creep. Having the piping located on the outside of the structure makes this creep monitoring much easier than in other previous designs.

In addition, the heat exchanger of the invention preferably uses readily available cheap standard finned piping, instead of a specially designed heat exchanger as in U.S. Pat. No. 8,146,414. This can significantly reduce the cost of construction and of ownership (less frequent inspections are required).

One example of the heat exchanger of the invention is demonstrated in FIG. 1. FIG. 1 shows a heat exchanger (1) that has a structure comprising a solid rectangular frame (2). The heat exchanger has piping (3) that completes one circumference around the rectangular frame (2). The piping has an inlet end (4) and an outlet end (5). The piping contains external cooling fins (6) that are demonstrated on just one side of the piping circumference. The piping is supported to the frame on a series of moving supports (7). The heat exchanger of FIG. 1 is shown to have one fan (8) for circulating air across the piping in order to warm or cool the contents that move through the piping. The structure is sealed except for where the piping is located. The opening (9) allows for cool air to flow over the piping and hot air to be extracted from an exhaust vent (10) connected to the one or more fans.

FIG. 2 illustrates the blind tee at the corner of the piping circumference. The blind tee (20) connects piping on one side of the piping circumference (21) with piping on the connected side (22). The blind tee is arranged with one end sealed using a blind flange (23). The use of a blind tee ensures that erosion from the powder flowing inside the piping is minimized. The flow of powder is illustrated by the flow of the arrows within the illustrated piping. The blind tee works by allowing the catalyst that flows into the tee fills up the blind end, and then as additional catalyst flows into the tee it is then forced to turn by bouncing off the catalyst that has settled inside the blind tee. FIG. 2 also illustrates the moving support (24) that is attached to the underside of the piping. The moving support consists of a shoe (25). The shoe can slide on a support plate that is attached to the structure of the heat exchanger on the frame.

We claim:

1. A heat exchanger for cooling particulate matter from a high-temperature industrial process or warming material from a cryogenic process, said heat exchanger comprising:
   (a) a structure comprising a rectangular frame;
   (b) piping that is supported by the rectangular frame and completes at least one circumference around the rectangular frame, wherein the piping is supported to the rectangular frame on a series of moving supports, and the piping comprises an inlet end and an outlet end, and the piping contains external cooling fins; and
   (c) one or more fans to circulate air across the piping in order to warm or cool the particulate matter or material that move through the piping;
   wherein the structure is sealed except for where the piping is located and at an opening to an exhaust vent connected to the one or more fans; and
   the outlet end of the piping is connected to one or more collection vessels.

2. The heat exchanger of claim 1, wherein each piping circumference contains at least one corner, and at each corner of each piping circumference, the piping is connected with a pipe tee having one end sealed.

3. The heat exchanger of claim 1, wherein the one or more fans are centrally located on the structure above the piping.

4. The heat exchanger of claim 1, wherein the particulate matter comprises catalysts and/or additives from a regenerator of a fluid catalytic cracking (FCC) process.

5. The heat exchanger of claim 1, wherein the material from the cryogenic process comprises a product of a pharmaceutical manufacturing process.

6. The heat exchanger of claim 1, wherein the particulate matter comprises catalysts and/or additives from a methanol conversion process.

7. The heat exchanger of claim 1, wherein the moving supports are spring hangers or sliding plates.

8. The heat exchanger of claim 1, wherein the heat exchanger is supported off the ground on one or more legs.

9. The heat exchanger of claim 1, wherein the outlet end of the piping is connected to two or more collection vessels.

10. The heat exchanger of claim 1, wherein the rectangular frame is in the shape of a square.

\* \* \* \* \*